UNITED STATES PATENT OFFICE.

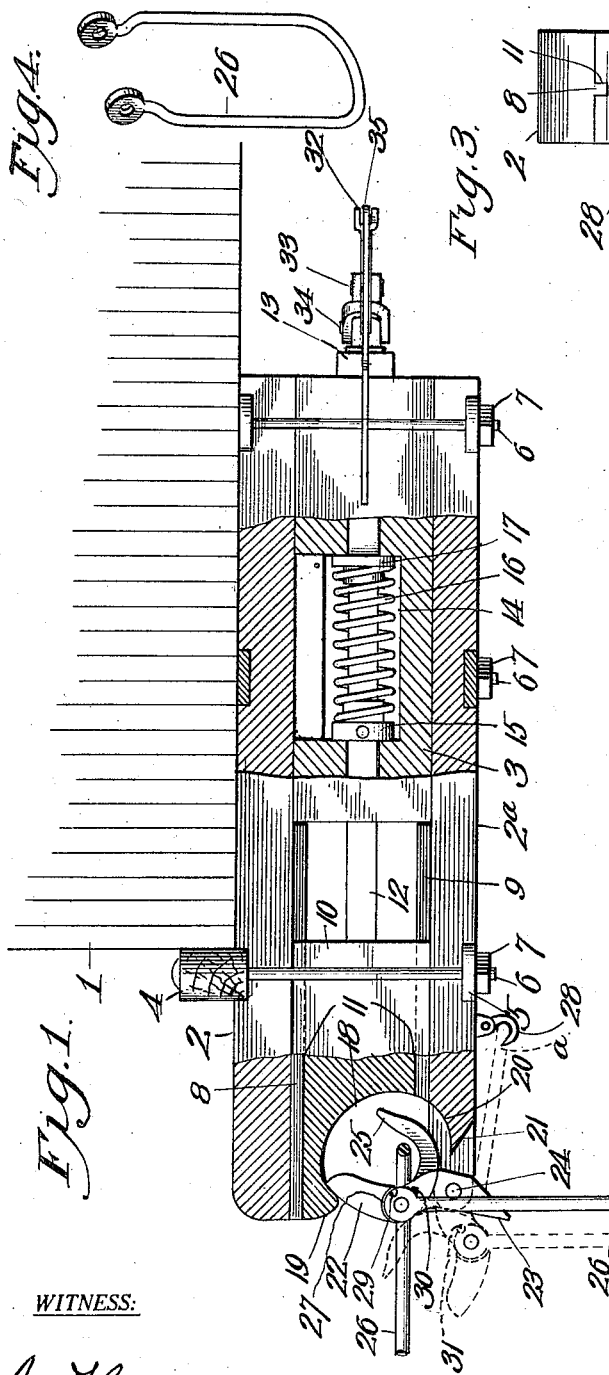

BENJAMIN L. BALDWIN, OF KANSAS CITY, MISSOURI.

AUTOMATIC CAR COUPLING.

1,418,861. Specification of Letters Patent. Patented June 6, 1922.

Application filed July 28, 1919. Serial No. 313,792.

*To all whom it may concern:*

Be it known that I, BENJAMIN L. BALDWIN, a citizen of the United States, residing at Kansas City, in the county of Jackson and State of Missouri, have invented certain new and useful Improvements in Automatic Car Couplings, of which the following is a specification.

This invention relates to car couplers and has for its object to produce a coupler construction which is automatic in the coupling operation and can be uncoupled by manual power or power derived from the air brake pressure or the like, without requiring the operator to step or reach between the coupled cars.

A further object is to produce a car coupler of universal application and susceptible of use with baggage trucks and other vehicles of transportation whether for use on trucks or not.

With these general objects in view the invention consists in certain novel and useful features of construction and organization of parts as hereinafter described and claimed; and in order that it may be fully understood reference is to be had to the accompanying drawing, in which:

Figure 1, is a view partly in side elevation and partly in central vertical section of a car coupler embodying the invention.

Figure 2, is a plan view with the body of the car omitted, and with parts broken away to disclose interior mechanism.

Figure 3, is an elevation of the front end of the coupler.

Figure 4, is a detail perspective view of one of the coupling links.

In the said drawing, 1 indicates the body of a freight car. The same is provided at each end with a coupler, one only appearing.

The coupler is constructed as follows: 2 and $2^a$ indicate parallel top and bottom beams spaced apart by an abutment frame 3, and clamping said beams and frame in rigid relation are top and bottom cross bars 4 and 5 set in beams 2 and $2^a$ respectively and connected together by vertical bolts 6 engaged at the lower ends by retaining nuts 7, the cross bars 4 and 5 being secured in rigid relation to the cross frame in any suitable or preferred manner.

The beams 2 and $2^a$ project a substantial distance forwardly beyond the abutment frame and the adjacent end of the car and are provided centrally at their inner sides with longitudinal guide ribs 8 and 9 respectively. Fitting slidingly between the beams 2 and $2^a$ and normally spaced a substantial distance forward of the abutment frame 3 is the coupler head 10, the same having long grooves 11 in its upper and lower faces receiving the guide ribs 8 and 9. The head is provided with a rearwardly projecting stem 12 extending slidingly through the abutment frame and equipped at its rear end with a stop collar 13 engaging the rear end of the abutment frame and limiting forward adjustment of the coupler head.

The abutment frame is provided with an opening 14 constituting an enlargement of the passage through which stem 12 extends, and secured on said stem at the front end of said opening is a collar 15 engaged by the front end of an expansion coiled spring 16 bearing at its rear end against a collar 17 loosely mounted on the stem and held by said spring against the rear wall of the opening 14, the force of said spring therefore serving to hold the coupler head in its advanced position and with the stop collar 13 against the rear end of the abutment frame, the spring being adapted to yield under the impact on the coupling head incident to the coupling operation and then return the coupler head to its normal or advanced position, as hereinafter more particularly referred to.

The front end of the coupler head is provided with an opening 18 and at the front and upper end of said opening with a depending transverse shoulder 19 of substantially V-shape in cross section. The lower end of the opening 18 registers with a recess 20 in the upper side of the beam $2^a$, and the front end of said beam is vertically bifurcated, the rear wall of the bifurcation forming a downwardly facing shoulder 21.

22 indicates the coupling jaw, the same being of curved form and having a central stem 23 extending through the bifurcation of beam $2^a$ and pivoted therein at 24, the said stem when the coupling jaw is open as indicated by dotted lines, extending longitudinally in the bifurcation and engaging the shoulder 21 whereby the opening movement of the jaw is limited. The jaw is provided with a curved operating arm 25 bowed oppositely to the jaw which is of curved form by preference, as shown, and said operating arm when the jaw is open, extends upwardly and forwardly in the path of movement of the coupling link 26 of another car, so that said link as the cars come together shall enter the mouth conjointly formed by the coupling jaw and arm 25 and by impact on the latter, swing the coupling jaw upwardly and rearwardly and through said link the thrust of the latter on the arm 25 continuing so as to cause the coupling jaw to strike the shoulder 19 and force the coupler head inward until the latter passes beyond the free end of the coupling jaw, the operating arm 25 at the same time swinging downward into the recess 20 of beam 2$^a$, to accommodate this movement. The rearward movement of the coupler head thus effected is resisted by the spring 16, and the same reacts the instant the free end of the coupler jaw rides past the shoulder 19, and instantly readvances the coupler head and thus locks the coupling jaw within the mouth of the coupler head, so that the pull of the link applied on the coupling jaw is transferred to the beam 2$^a$ of the shoulder of the coupler head, as will be readily understood by reference to Figure 1, where the coupling jaw is shown in coupled position in full lines.

As each coupler jaw is equipped with a link 26, it is necessary that the inoperative link shall be so formed and arranged, as to avoid interference with the operative link. By reference to Figure 2, it will be noted that the pivoted end of the link is set in a recess 27 in the coupling jaw and depends vertically therefrom although it may if necessary be swung back to a position indicated by the dotted line $a$ and supported in such position by a pivoted catch 28 suspended from the beam 2$^a$, it being further noted that the pivoted ends of the link are closer together than the remainder of the side arms thereof in order that the space between the latter shall be wide enough to readily receive the coupling jaw of an adjacent car, the outer face of the pivoted ends being substantially flush with the sides of the coupling jaw so as to avoid interfering with the active coupling link when the coupling jaw engaged by the latter, is in closed or operative position, at which time the link pivotally suspended therefrom receives the front end of the beam 2$^a$, as will be readily understood by reference to Figure 1. It is necessary to provide means for holding the active coupling link in a substantially horizontal position when the jaw carrying the same is in closed or operative position, provided such link is to constitute the coupling element, and to accomplish this the pivoted end of each link is provided with a peripheral notch 29 for registration with an opening 30 in its respective coupling jaw, a pin 31 being inserted in said registering notch and opening to lock the link in the horizontal position mentioned, the pin being removed to permit the link to swing relatively rearward when the coupling jaw is closed to avoid interference with the active link, as hereinbefore explained.

To effect the uncoupling operation the following mechanism is provided: 32 is a lever fulcrumed at 33 on the abutment frame and having a pin and slot connection at 34 with the rear end of the coupler head stem 12. The outer end of said lever is forked and has pivotal connection with the slotted end of a rod 35 susceptible of being drawn forward by hand from a point at the side or top of the car as desired, this action effecting sufficient rearward movement of the coupler head to withdraw its shoulder 19 beyond the free end of the coupling jaw 22 so that the pull on the coupling jaw shall swing the latter forward until the active link 26 slips over its free end.

While the drawing shows and the description relates to the coupler as applied to a railroad car, it will be understood that this coupler may be applied to baggage trucks or to other vehicles of transportation which it is found desirable to frequently couple together, though for use on trucks and other light vehicles the manually operable controlling means alone will be required.

From the above description it will be apparent that I have produced a car coupler embodying the features of advantage enumerated as desirable in the statement of the object of the invention, and while I have illustrated and described the preferred embodiment of the same, it is to be understood that I reserve the right to all changes properly falling within the principle of construction involved and the spirit and scope of the appended claims.

I claim:

1. A car coupler comprising a draw head, a yieldingly advanced coupler head fitting slidably in the draw head and provided with a mouth at its front end and a shoulder depending at the forward portion of the mouth, a coupling jaw pivoted to the lower part of the draw head and when closed extending upward and closing said mouth of the coupler head and engaging the rear side of said shoulder, and means for moving the coupler head rearward until said shoulder rides over and clears said coupling jaw.

2. A car coupler comprising a draw head, a yieldingly advanced coupler head fitting slidably in the draw head and provided with a mouth at its front end and a shoulder depending at the forward portion of the mouth, a coupling jaw pivoted to the lower part of the draw head and when closed extending upward and closing said mouth of the coupler head and engaging the rear side of said shoulder, and manually operable means for moving the coupler head rearward until said shoulder rides over and clears said coupling jaw.

3. A car coupler comprising a draw head, a yieldingly advanced coupler head mounted in the draw head and provided with a mouth and a depending shoulder at the upper front edge of said mouth, a coupling jaw pivoted to the draw head at the lower front edge of the mouth, and an operating arm projecting upwardly and forwardly from the coupling jaw when the same is opened to receive the impact of a coupling link on another car and be swung back with the coupling jaw into the mouth of said coupler head; the coupling jaw repressing the coupler head in such action until its free end clears the shoulder of the coupler head.

4. A car coupler comprising a draw head, a yieldingly advanced coupler head mounted in the draw head and provided with a mouth and a depending shoulder at the upper front edge of said mouth, a coupling jaw pivoted to the draw head at the lower front edge of the mouth, and an operating arm projecting upwardly and forwardly from the coupling jaw when the same is opened to receive the impact of a coupling link on another car and be swung back with its coupling jaw into the mouth of said coupler head; a coupling jaw repressing the coupler head in such action until its free end clears the shoulder of the coupler head, and a stem projecting from the coupling jaw to underlie and engage the draw head when the coupling jaw is open to limit the opening movement thereof.

5. A car coupler comprising a draw head, a yieldingly advanced coupler head mounted in the draw head and provided with a mouth and a depending shoulder at the upper front edge of said mouth, a coupling jaw pivoted to the draw head at the lower front edge of the mouth, and an operating arm projecting upwardly and forwardly from the coupling jaw when the same is opened to receive the impact of a coupling link on another car and be swung back with its coupling jaw into the mouth of said coupler head; the coupling jaw repressing the coupler head in such action until its free end clears the shoulder of the coupler head, a stem projecting from the coupling jaw to underlie and engage the draw head when the coupling jaw is open to limit the opening movement thereof, a substantially U-shaped link pivoted to the coupling jaw, and means to secure said link in a forwardly projecting position from said jaw when the latter is in upright or closed position.

In testimony whereof I affix my signature.

BENJAMIN L. BALDWIN.